United States Patent
Wang et al.

(10) Patent No.: US 9,454,612 B2
(45) Date of Patent: *Sep. 27, 2016

(54) ITEM SELECTION IN CURATION LEARNING

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

(*) Notice: Subject to any disclaimer, the term of this patent is extended or adjusted under 35 U.S.C. 154(b) by 343 days.

This patent is subject to a terminal disclaimer.

(21) Appl. No.: 14/013,113

(22) Filed: Aug. 29, 2013

(65) Prior Publication Data

US 2015/0066917 A1    Mar. 5, 2015

(51) Int. Cl.
*G06F 17/30* (2006.01)

(52) U.S. Cl.
CPC ............... *G06F 17/30867* (2013.01)

(58) Field of Classification Search
None
See application file for complete search history.

(56) References Cited

U.S. PATENT DOCUMENTS

| | | | | |
|---|---|---|---|---|
| 6,601,061 B1* | 7/2003 | Holt | ................. | G06F 17/30864 707/1 |
| 8,645,394 B1* | 2/2014 | Kolak | ................. | G06F 17/3071 707/748 |
| 8,825,759 B1* | 9/2014 | Jackson | ................. | H04L 67/02 705/14.69 |
| 2008/0172445 A1* | 7/2008 | Zaidelson | ............. | G06Q 10/10 709/201 |
| 2013/0339180 A1* | 12/2013 | LaPierre | ............ | G06Q 30/0631 705/26.7 |

OTHER PUBLICATIONS

N. Yen et al., "Ranking Metrics and Search Guidance for Learning Object Repository", IEEE Transactions on Learning Technologies, vol. 3 Issue 3, Jul. 2010.

X. Ochoa et al., "Relevance Ranking Metrics for Learning Objects", IEEE Transactions on Learning Technologies, vol. 1 Issue 1, Jan. 2008.

* cited by examiner

*Primary Examiner* — Son T Hoang
(74) *Attorney, Agent, or Firm* — Maschoff Brennan

(57) ABSTRACT

A method of ranking candidate curation items includes receiving a query. The method also includes extracting items from multiple curations. The method also includes calculating, based on the query, a content similarity measurement for each of the extracted items. The method also includes extracting, from each of the extracted items, multiple curation-specific features. The method also includes calculating one or more curation-specific measurements for each of the extracted items based on the extracted curation-specific features, the one or more curation-specific measurements being different than the content similarity measurement. The method also includes ranking each of the extracted items based on both the content similarity measurement and the one or more curation-specific measurements to generate multiple curation item results.

16 Claims, 7 Drawing Sheets

ITEM SELECTION IN CURATION LEARNING

FIELD

The embodiments discussed herein are related to item selection in curation learning.

BACKGROUND

Curation learning refers to learning from curations created by curators. Curations may include value-added lists of items, such as digital files, that are well-organized by the curator. Each curation may combine existing content with new perspectives. For example, a curation for learning a topic of interest may include items such as a web page describing the topic and one or more videos of introductory training for the topic, each taught by different instructors. Although such items may not exist together in each of their respective source locations on the Internet or other network, a curator may organize and group the items together in a curation to provide the curator's perspective on learning the topic of interest. The large and ever-increasing volume of digital files available on the Internet may make it difficult for curators to search for and select relevant items for inclusion in curations created by the curators.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of ranking candidate curation items includes receiving a query. The method also includes extracting items from multiple curations. The method also includes calculating, based on the query, a content similarity measurement for each of the extracted items. The method also includes extracting, from each of the extracted items, multiple curation-specific features. The method also includes calculating one or more curation-specific measurements for each of the extracted items based on the extracted curation-specific features, the one or more curation-specific measurements being different than the content similarity measurement. The method also includes ranking each of the extracted items based on both the content similarity measurement and the one or more curation-specific measurements to generate multiple curation item results.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some curation engines used by curators for creating curations use standard web search engines and social media search services to allow users, e.g., curators to search for and select items for inclusion in curations. These standard web engines and social media search services are not optimized for learning and/or are not optimized with curation-specific features. Open courseware (OCW) searches focus on crawled open education resources (hereinafter "OERs" or "OER resources") and allow users to search for and select items based on simple text content similarity. OCW searches are not optimized with learning-specific features. Learning object repositories (LORs) are closed and manually maintained repositories that require manually input and structured metadata. LORs search learning objects instead of items contained in the learning objects.

Embodiments described herein may be optimized with curation-specific features, including ranking items in a search based on one or more curation-specific measurements. Examples of curation-specific measurements may include a curation item popularity credit measurement and an item curator credit measurement as described in more detail herein. Thus, embodiments described herein may facilitate the search for and selection of relevant items to include in a curation being created by a curator.

Alternately or additionally, embodiments described herein may involve a multi-level search of resources, including a web search of web resources, a search of OER resources utilizing learning-specific features, and/or a search of curation resources utilizing curation-specific features. In these and other embodiments, the results of the various levels of the multi-level search, e.g., web results, OER results, and curation item results, may be unified as described in more detail herein.

Embodiments of the present invention will be explained with reference to the accompanying drawings.

Figure 1A:
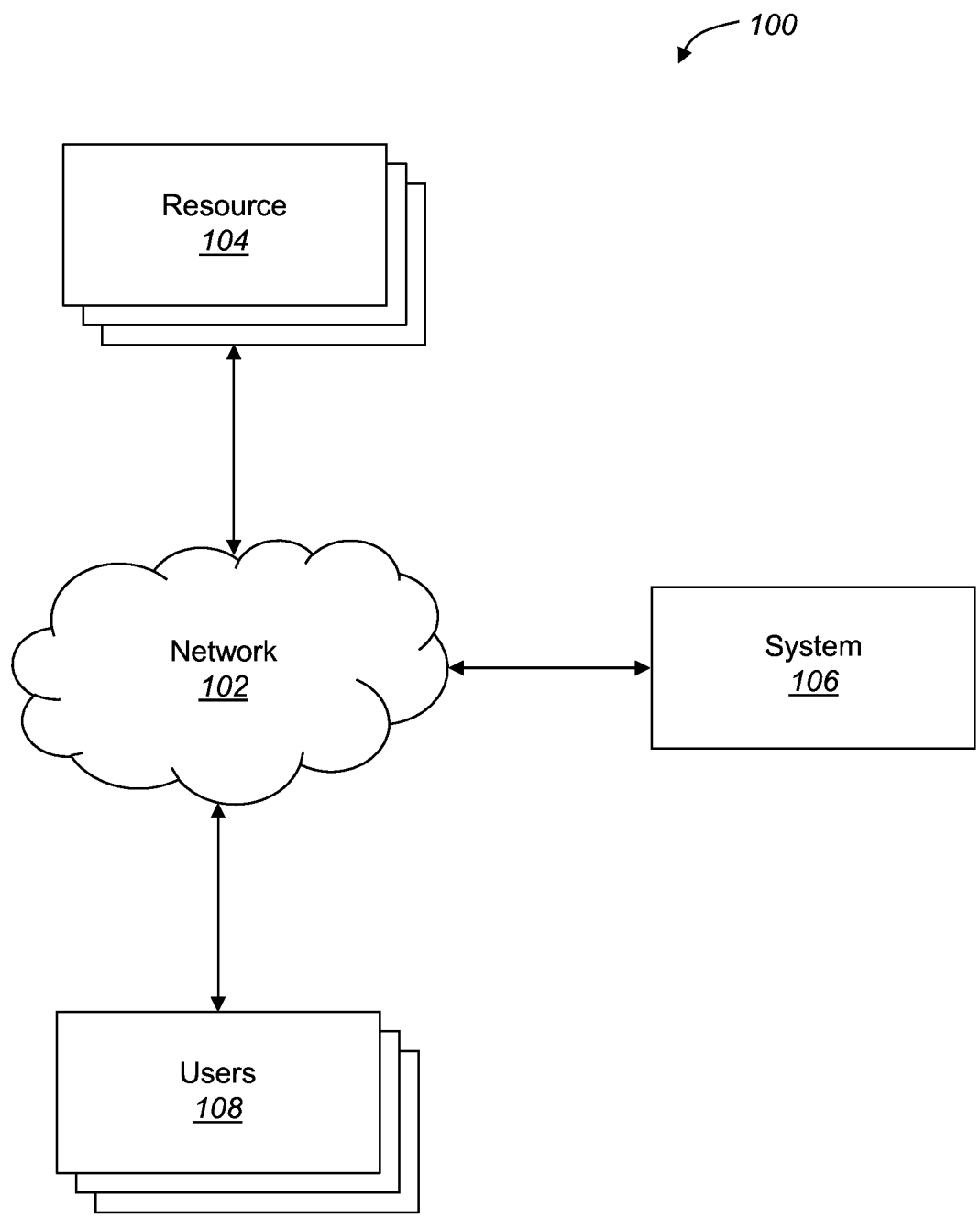
FIG. 1A is a block diagram of an example operating environment in which some embodiments may be implemented.

FIG. 1A is a block diagram of an example operating environment 100 in which some embodiments may be implemented. The operating environment may include a network 102, resources 104, a curation item search and ranking system (hereinafter "system") 106, and one or more end users (hereinafter "user" or "users") 108.

In general, the network 102 may include one or more wide area networks (WANs) and/or local area networks (LANs) that enable the system 106 and/or the users 108 to access the resources 104 and/or to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The resources 104 may include any of a variety of online resources such as general web resources, OER resources, and/or curation resources. General web resources may include any resource accessible on or through the network 102, including various websites, OER resources, and/or curation resources, among potentially others. OER resources may include learning materials such as open courseware (OCW) learning materials, massive open online courses (MOOC) learning materials, course pages for courses taught at educational institutions by individuals including professors and lecturers, lecture notes and/or recordings (e.g., video and/or audio recordings) associated with such courses, online publications including journal articles and/or conference papers, or the like or any combination thereof. Curation resources may include any database or repository of curations. As used herein, a "curation" may include a value-added list of items, such as digital files, well-organized by a user or other entity referred to as a "curator." Examples of items that may be included in curations include, but are not limited to, web pages, audio files, video files, electronic documents, and virtually any other digital content. The resources 104 may be accessible on websites hosted by one or more corresponding web servers communicatively coupled to the Internet, for example.

The users 108 include people and/or other entities that desire to find items from among the resources 104 that satisfy or match a particular query for inclusion in curations created by the users 108. Alternately or additionally, the users 108 may include people and/or other entities that desire to find curations for learning from among the curations 104 that satisfy or match a particular query for inclusion in curations created by the users 108. Example queries may include one or more keyword or search terms and/or requests to identify items or resources 104 that are similar or related to a selected item or a selected resource 104. Although not separately illustrated, each of the users 108 typically communicates with the network 102 using a corresponding computing device. Each of the computing devices may include, but is not limited to, a desktop computer, a laptop computer, a tablet computer, a mobile phone, a smartphone, a personal digital assistant (PDA), or other suitable computing device.

Figure 1B:
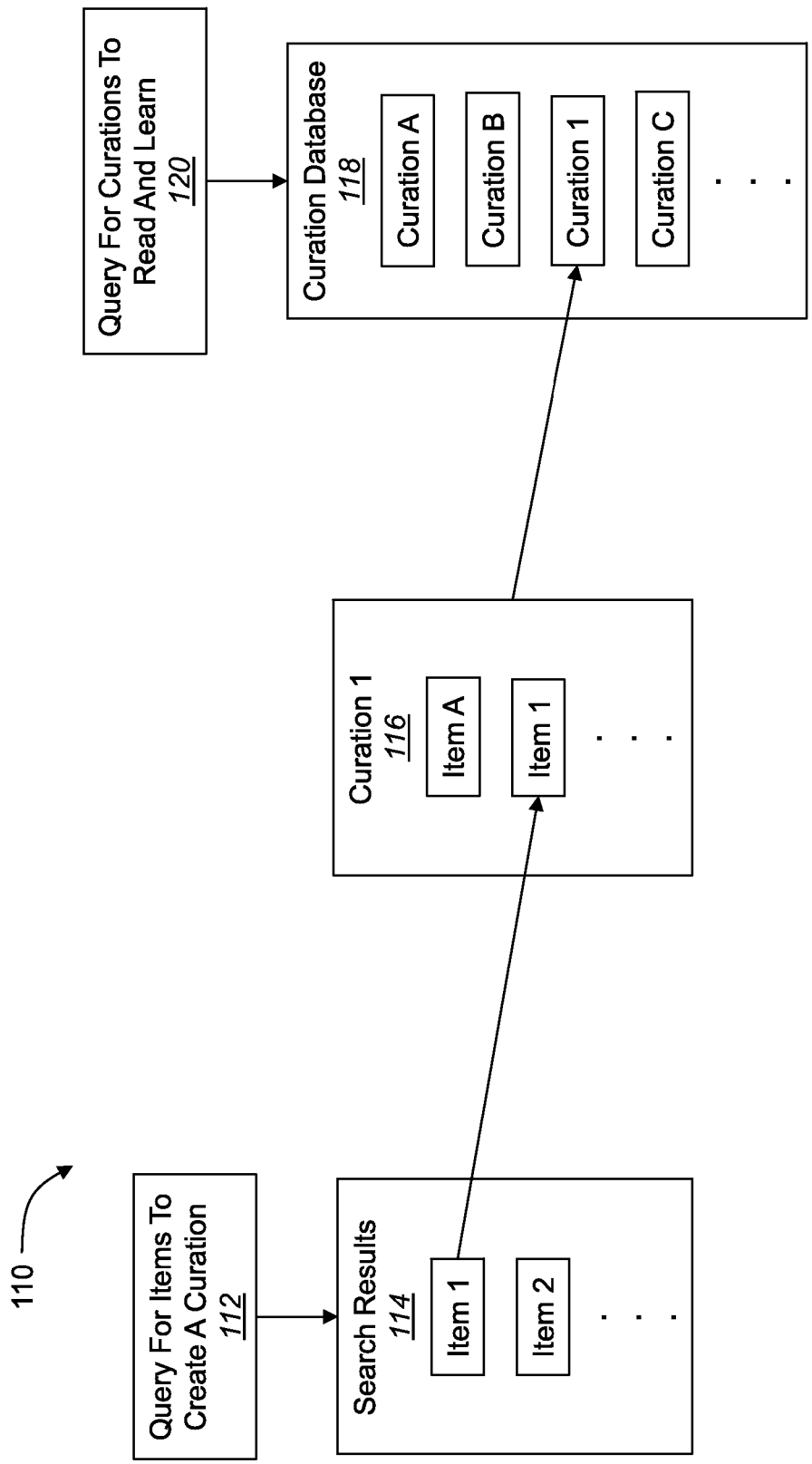
FIG. 1B shows an example flow diagram of a method of using a system included in the operating environment of FIG. 1A.

FIG. 1B shows an example flow diagram of a method 110 of using the system 106 of FIG. 1A, arranged in accordance with at least one embodiment described herein. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The method 110 of FIG. 1B will be discussed in combination with the operating environment 100 of FIG. 1A. The method 110 may begin at block 112 in which one of the users 108 queries for items to create a curation. In particular, the user 108 may query for items to include in a curation being created by the user 108.

The system 106 may search the resources 104 for items based on the query and curation-specific features. Optionally, the search may be further based on learning-specific features. In some embodiments, the system 106 performs a multi-level search including a web search in the web resources, a search based on curation-specific features in the curation resources, and/or a search based on learning-specific features in the OER resources. The system 106 outputs search results 114 including one or more items, such as "Item 1" and "Item 2," which may be ranked and unified based on scores from the multi-level search, as discussed in more detail below.

The user 108 may select any of the items in the search results 114, such as the "Item 1," to include along with one or more other items in a curation 116, "Curation 1," being created by the user 108. Some embodiments described herein generally relate to the search for and selection of items to include in curations being created by the users 108.

As further illustrated in FIG. 1B, after the user 108 has completed adding items to the curation 116, the curation 116 may be saved in a curation database 118 along with one or more other curations. At block 120, the method 110 may additionally include the same or another one of the users 108 querying the curation database 118 for curations to read and/or learn.

Figure 2:
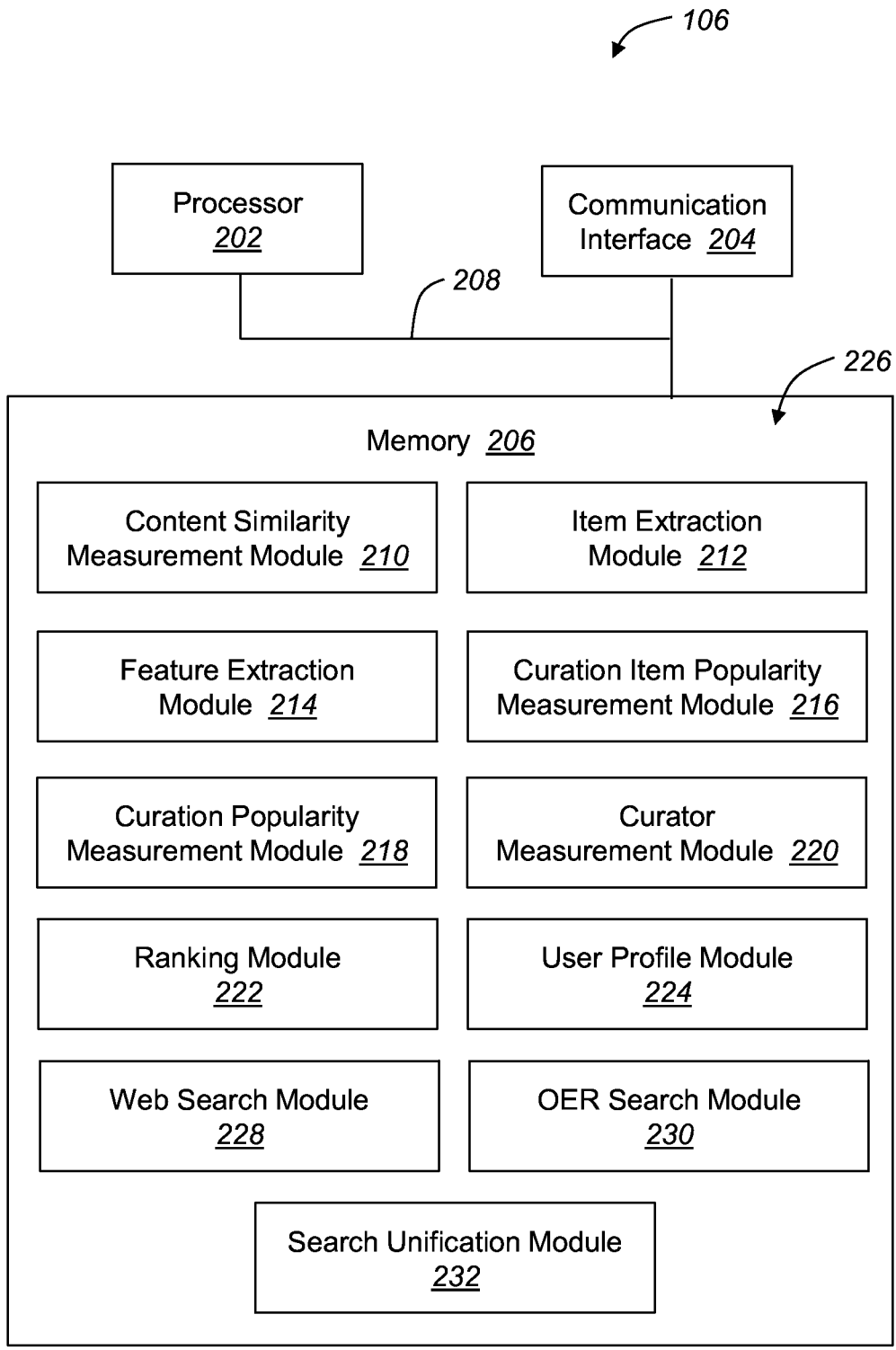
FIG. 2 is a block diagram of an example embodiment of the system of FIG. 1A.

FIG. 2 is a block diagram of an example embodiment of the system 106 of FIG. 1A, arranged in accordance with at least one embodiment described herein. As illustrated, the system 106 includes a processor 202, a communication interface 204, and a memory 206. The processor 202, the communication interface 204, and the memory 206 may be communicatively coupled via a communication bus 208. The communication bus 208 may include, but is not limited to, a memory bus, a storage interface bus, a bus/interface controller, an interface bus, or the like or any combination thereof.

In general, the communication interface 204 may facilitate communications over a network, such as the network 102 of FIG. 1A. The communication interface 204 may include, but is not limited to, a network interface card, a network adapter, a LAN adapter, or other suitable communication interface.

The processor 202 may be configured to execute computer instructions that cause the system 106 to perform the functions and operations described herein, such as receiving a query, extracting items from curations, calculating a content similarity measurement for each of the extracted items based on the query, extracting curation-specific features from the extracted items, calculating one or more curation-specific measurements for each of the extracted items based on the extracted curation-specific features, and ranking each of the extracted items based on both the content similarity measurement and the one or more curation-specific measurements to generate curation item results. The processor 202 may include, but is not limited to, a processor, a microprocessor (µP), a controller, a microcontroller (µC), a central processing unit (CPU), a digital signal processor (DSP), any combination thereof, or other suitable processor.

Computer instructions may be loaded into the memory 206 for execution by the processor 202. For example, the computer instructions may be in the form of one or more modules, such as, but not limited to, a content similarity measurement module 210, an item extraction module 212, a feature extraction module 214, a curation item popularity measurement module 216, a curation popularity measurement module 218, a curator measurement module 220, a ranking module 222, and/or a user profile module 224 (collectively "modules 226"). Optionally, the modules 226 may further include a web search module 228, an OER search module 230, and/or a search unification module 232.

In some embodiments, data generated, received, and/or operated on during performance of the functions and operations described herein may be at least temporarily stored in the memory 206. Moreover, the memory 206 may include volatile storage such as RAM. More generally, the system 106 may include a non-transitory computer-readable medium such as, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium.

The item extraction module 212 may be configured to extract items from each of multiple curations, including identifying at least some of the individual items making up each of the curations. For example, the item extraction module 212 may be configured to extract some or all of the items from each of the curations in a curation database.

The content similarity measurement module 210 may be configured to calculate a content similarity measurement for each of the extracted items based on a query received from a user. The calculation of the content similarity measurement may additionally be based on a user profile associated with the user from which the query is received.

In these and other embodiments, the query and each of the extracted items may be represented as a term vector in a vector space model. For each of the extracted items, a content similarity measurement, CSM_m, may be calculated according to the following formula:

$$CSM\_m = \text{Similarity}(q, d) = \cos(\theta), \ 0 < \cos(\theta) < 1,$$

where q is the term vector of the query, d is the term vector of the corresponding extracted item m, and $\cos(\theta)$ is the cosine of the angle $\theta$ between the term vectors q and d. When the content similarity measurement is additionally based on the user profile, a weight of terms in the term vector d that match keywords in the user profile, such as topics of interest in the user profile, may be boosted in the content similarity measurement for the corresponding extracted item.

The feature extraction module 214 may be configured to extract curation-specific features from the extracted items. The curation-specific features for a given one of the extracted items may include, but are not limited to, a curator of a curation from which the item has been extracted, feedback associated with the curation from which the item has been extracted—such as number of views of the curation, number of bookmarks to the curation, number of comments associated with the curation, number of likes, or other feedback associated with the curation—a title of the extracted item, a content of the extracted item, or the like or any combination thereof.

The curation item popularity measurement module 216 may be configured to calculate a curation item popularity credit measurement based on the extracted curation-specific features. The curation item popularity credit measurement may relate to a popularity of a corresponding extracted item. In these and other embodiments, the curation item popularity credit measurement may be relatively greater for extracted items that are included in relatively more curations than for extracted items that are included in relatively fewer curations. In some embodiments, the curation item popularity credit measurement may be calculated according to the following formula:

$$\text{Item\_Popularity\_Credit}\_m = \sum_{i=1}^{CN} \text{Curation\_Popularity}\_i / INi,$$

where Item_Popularity_Credit_m is the curation item popularity credit measurement of the corresponding extracted item m, CN is a number of curations that each include the corresponding extracted item m, Curation_Popularity_i is a curation popularity credit measurement of curation i, and INi is a number of items included in the curation i. Thus, the curation item popularity credit measurement of a given extracted item may generally increase with increasing number of curations that include the extracted item and may generally decrease with increasing number of items included in the same curations as the given extracted item.

By way of example, suppose an extracted item is included in three different curations, respectively having Curation_Popularity_i values of 0.079, 0.06, and 0.05 and respectively having INi values of 3, 4, and 5. In this example, the curation item popularity credit measurement may be calculated consistent with the foregoing formula as 0.079/3+0.06/4+0.05/5=0.0513.

The foregoing formula for calculating the curation item popularity credit measurement is provided by way of example only and should not be construed to limit the described embodiments. For instance, while the foregoing formula evenly distributes credit to all items in a given curation, in other embodiments, credit may instead be distributed in an uneven and/or weighted manner depending on a type of the items and based on user preference. For instance, video items may be assigned a higher weight than web page items or other non-video items if a user profile of the user indicates a preference for video items.

The curation popularity measurement module 218 may be configured to calculate the curation popularity credit measurement, or Curation_Popularity_i, of each curation that includes the given extracted item. The curation popularity credit measurement may relate to a popularity of each curation that includes the given extracted item. In these and other embodiments, the curation popularity credit measurement may be relatively greater for relatively more popular curations. In some embodiments, the curation popularity credit measurement of a curation i may be calculated according to the following formula:

$$\text{Curation\_Popularity}\_i = V^* \text{View\_Score}\_i + B^* \text{Bookmark\_Score}\_i + C^* \text{Comment\_Score}\_i,$$

where V, B, and C are constants, V+B+C=1, View_Score_i is a view score of the curation i calculated based on a number of views of the curation i, Bookmark_Score_i is a bookmark score of the curation i calculated based on a number of bookmarks to the curation i, and Comment_Score_i is a comment score of the curation i calculated based on a number of comments to the curation i. More generally, the Curation_Popularity_i may be calculated as a sum of one or more feedback scores each multiplied by a corresponding feedback constant, such as V, B, and C.

By way of example, suppose V=0.3, B=0.5, and C=0.2 for a given curation. Further suppose View_Score_i=0.05, Bookmark_Score_i=0.1, and Comment_Score _i=0.07. In this example, the Curation_Popularity_i of the given curation may be calculated consistent with the foregoing formula as Curation_Popularity_i=0.3*0.05+0.5*0.1+0.2*0.07=0.079. The foregoing values for V, B, and C are provided by way of example only and should not be construed as limiting. The foregoing values for View_Score_i, Bookmark_Score_i, and/or Comment_Score_i are also provided by way of example and not limitation and may be calculated according to any formula, some examples of which are provided below.

The curation popularity measurement module 218 and/or another one of the modules 226 may be further configured to calculate View_Score_i, Bookmark_Score_i, and/or Comment_Score_i. The View_Score_i may reflect a popularity of a given curation i by views and may be calculated according to the following formula:

$$\text{View\_Score\_}i = \sum_{j=1}^{Ni1} e^{-\lambda 1(t-t_{j1})} / \sum_{i=1}^{M1} \sum_{j=1}^{Ni1} e^{-\lambda(t-t_{j1})},$$

where λ1 is a constant factor for adjusting an impact of time on the View_Score_i, M1 is a number of total curations from which items have been extracted, Ni1 is a number of views of curation i, t is a current time, and $t_{j1}$ is a time of a jth view of the curation i in days or hours or any other desired units. In some embodiments, if the total number Ni1 of views of curation i is 0, then the View_Score_i may be equal to 0.

The Bookmark_Score_i may reflect a popularity of a given curation i by bookmarks to the curation and may be calculated according to the following formula:

$$\text{Bookmark\_Score\_}i = \sum_{j=1}^{Ni2} e^{-\lambda 2(t-t_{j2})} / \sum_{i=1}^{M2} \sum_{j=1}^{Ni2} e^{-\lambda(t-t_{j2})},$$

where λ2 is a constant factor for adjusting an impact of time on the Bookmark_Score_i, M2 is a number of total bookmarked curations from which items have been extracted, Ni2 is a number of bookmarks to curation i, t is a current time, and $t_{j2}$ is a time of a jth bookmark to the curation i in days or hours or any other desired units. In some embodiments, if the total number Ni2 of bookmarks to curation i is 0, then the Bookmark_Score_i may be equal to 0.

The Comment_Score_i may reflect a popularity of a given curation i by comments to the curation and may be calculated according to the following formula:

$$\text{Comment\_Score\_}i = \sum_{j=1}^{Ni3} e^{-\lambda 3(t-t_{j3})} / \sum_{i=1}^{M3} \sum_{j=1}^{Ni3} 3^{-\lambda(t-t_{j3})},$$

where λ3 is a constant factor for adjusting an impact of time on the Comment_Score_i, M3 is a number of total commented curations—e.g., curations to which comments have been made—from which items have been extracted, Ni3 is a number of comments to curation i, t is a current time, and $t_{j3}$ is a time of a jth comment to the curation i in days or hours or any other desired units. In some embodiments, if the total number Ni3 of comments to curation i is 0, then the Comment_Score_i may be equal to 0.

In some embodiments, λ1, λ2, and λ3 may have the same value, or they may have different values. Alternately or additionally, based on the above formulas for View_Score_i, Bookmark_Score_i, and Comment_Score_i, each of View_Score_i, Bookmark_Score_i, and Comment_Score_i may be a normalized value between 0 and 1 for any given curation.

The above formulas for View_Score_i, Bookmark_Score_i, and Comment_Score_i relate to specific types of feedback including views, bookmarks, and comments of a curation i. The above formulas may be generalized for any type of feedback including views, bookmarks, comments, likes (e.g., as used in Facebook), pluses (e.g., as used in Google+), or other feedback. For example, a generic formula for calculating a feedback score may be of the following form:

$$\sum_{j=1}^{Ni} e^{-\lambda(t-t_j)} / \sum_{i=1}^{M} \sum_{j=1}^{Ni} e^{-\lambda(t-t_j)},$$

where λ is a constant factor for adjusting an impact of time on the feedback score, M is a number of total curations having the specific type of feedback and from which items have been extracted, Ni is a number of the specific type of feedback associated with the curation t is a current time, and $t_j$ is a time of a jth feedback event (e.g., application of the specific type of feedback) to the curation i in days or hours or any other desired units. In some embodiments, if the total number Ni of the specific type of feedback to curation i is 0, then the feedback score may be equal to 0.

With continued reference to FIG. 2, the curator measurement module 220 may be configured to calculate a curation curator credit measurement based on the extracted curation-specific features. The curation curator credit measurement may be based on a popularity of all curations created by a curator and based on a social network influence of the curator. In these and other embodiments, the curation curator credit measurement may be relatively greater for curations created by curators that have created relatively more popular curations and/or that have relatively greater social network influence. In some embodiments, the curation curator credit measurement may be calculated according to the following formula:

$$\text{Curation\_Curator\_Credit\_}i = CCP_i * SNI_i,$$

where Curation_Curator_Credit_i is the curator credit measurement, $CCP_i$ is a curation content popularity of a curator of the curation i, and $SNI_i$ is a social network influence of the curator of the curation i.

In some embodiments, the curation curator credit measurement may be normalized on all curators. For example, suppose that the $CCP_i$ value and the $SNI_i$ value for the curator of the curation i are, respectively, 0.0378 and 0.01, such that a raw curation curator credit measurement is 0.00378 consistent with the foregoing formula for calculating Curation_Curator_Credit_i. The raw curation curator credit measurement may be normalized across all curators, e.g., raw curation curator credit measurements may be calculated for all curators and the raw curation curator credit measurements may be summed; the raw curation curator credit measurement of 0.00378 may then be divided by the sum of raw curation curator credit measurements to obtain a normalized curation curator credit measurement between 0 and 1. For example, if the sum of raw curation curator credit measurements is 0.252, the normalized curation curator credit measurement corresponding to the raw curation curator credit measurement of 0.00378 may be calculated as 0.00378/0.252=0.015.

In these and other embodiments, the curation content popularity $CCP_i$ of each curator may be calculated as an average of all curation popularity credit measurements corresponding to all curations created by the curator of the curation i. More particularly, the curation content popularity $CCP_i$ may be calculated by extracting all curations created by the curator of the curation i, calculating the curation popularity credit measurement for each of the extracted curations created by the curator as generally described above, calculating a total curation popularity credit measurement by summing the curation popularity credit measurements of the extracted curations created by the curator, and calculating an average curation popularity credit measurement by dividing the total curation popularity credit measurement by a number of the extracted curations created by the curator. The average curation popularity credit measurement may be used as the curation content popularity $CCP_i$ of the curator of the curation i.

Alternately or additionally, the social network influence $SNI_i$ of the curator of the curation i may be calculated based on a social feed following graph or other social graph algorithm or metric of the curator. Examples of social graph algorithms or metrics may include, but are not limited to, TwitterRank, Topic-specific PageRank, Topic-specific Tunk- Rank, or the like or any combination thereof. Descriptions of the foregoing are provided in: U.S. patent application Ser. No. 13/242,352; "TwitterRank: Finding Topic-sensitive Influential Twitterers" by J. Weng et al. (accessed on Jul. 29, 2013 at http://ink.library.smu.edu.sg/cgi/viewcontent.cgi?article=1503&context=sis_research); and "Overcoming Spammers in Twitter—A Tale of Five Algorithms" by D. Gayo-Avello et al. (accessed on Jul. 29, 2013 at http://di002.edv.uniovi.es/~dani/downloads/CERI2010-camera-ready.pdf), all of which are incorporated herein by reference.

The curation content popularity $CCP_i$ and/or the social network influence $SNI_i$ of the curator of the curation i may be calculated by the curator measurement module 220 and/or another one of the modules 226.

The curator measurement module 220 and/or another one of the modules 226 may be further configured to calculate an item curator credit measurement based on the extracted curation-specific features and/or other metrics described herein. The item curator credit measurement may be based on the curation content popularity CCP of each curator that has created at least one curation including a given extracted item and based on the social network influence SNI of each curator that has created at least one curation including the given extracted item. In some embodiments, the item curator credit measurement may be calculated according to the following formula:

$$\text{Item\_Curator\_Credit\_}m = \Sigma_{i=1}^{CN} \text{Curation\_Curator\_Credit\_}i/Ni,$$

where Item_Curator_Credit_m is the item curator credit measurement, and where CN, Curation_Curator_Credit_i, and INi are as already defined above.

With continued reference to FIG. 2, the ranking module 222 may be configured to rank each of the extracted items based on both the content similarity measurement and one or more curation-specific measurements such as the curation item popularity credit measurement, and/or the item curator credit measurement, to generate curation item results. Ranking the extracted items may include, for each of the extracted items, calculating a rank, R, of the corresponding one of the extracted items according to the following formula:

$$R = \alpha * CSM\_m + \beta * \text{Item\_Popularity\_Credit\_}m + \gamma * \text{Item\_Curator\_Credit\_}m,$$

where $\alpha$, $\beta$, and $\gamma$ are weighting factors, and CSM_m, Item_Popularity_Credit_m and Item_Curator_Credit_m are the measurements already described herein. The rank R calculated based on both the CSM_m and the curation-specific measurements may be referred to herein as a curation item score to distinguish it from other ranks discussed herein.

In an example embodiment, $\alpha + \beta + \gamma = 1$, and/or the weighting factors $\alpha$, $\beta$, and $\gamma$ may be, respectively, 0.5, 0.3, and 0.2. Alternately, the weighting factors $\alpha$, $\beta$, and $\gamma$ may be initially specified as first values, e.g., at 0.5, 0.3, and 0.2, respectively, and may then be refined by machine learning for optimizing the calculated rank R.

With continued reference to FIG. 2, the user profile module 224 may be configured to generate user profiles for the users that communicate with the system 106 to, e.g., submit queries to locate items in the creation of curations. The user profiles may include explicit user profiles, implicit user profiles, or any combination thereof.

Explicit user profiles may include keywords and other input explicitly provided by the users to build a user profile. Such keywords or other input may represent or correspond to topics of interest to the user, for example. In these and other embodiments, the user profile module 224 may guide each user through a process of building a profile, to the extent an explicit profile is desired.

Implicit user profiles may be auto-generated by tracking user activities, such as search activities, click activities, bookmark activities, or the like or any combination thereof. Contents involved in different activities may be assigned different weights. For example, contents from web pages that are bookmarked by a user may be assigned a higher weight than contents pointed to by links that are clicked by the user.

The explicit and/or implicit user profile for each user may be integrated into a text term vector that may be referred to as a user profile vector. When at least some terms in a term vector corresponding to an extracted item match at least some terms in the user profile vector, then the weight of the matching terms may be boosted in the content similarity measurement by the content similarity measurement module 210.

The web search module 228 may be configured to perform a web search based on the query received from the user. For example, the web search module 228 may include a web search engine, a plugin such as a GOOGLE search plugin or a YAHOO! search plugin, or the like or any combination thereof, configured to search web resources based on the query. The web search module 228 may generally perform web searches by calculating a content similarity measurement such as the CSM_m discussed above and ranking the results of the web search (hereinafter "web results") based substantially and/or solely on the content similarity measurement.

The OER search module 230 may be configured to perform an OER search based on the query and learning-specific features. For example, the OER search module 230 may be configured to search OER resources based on the query and learning-specific features to generate OER results. In some embodiments, the OER search module 230 alone or in combination with other modules within the system 106 may search OER resources based on the query and learning-specific features in a manner identical or substantially identical to the method(s) of automatically ranking and recommending open education materials disclosed in co-pending U.S. patent application Ser. No. 13/731,996 entitled RANKING AND RECOMMENDATION OF OPEN EDUCATION MATERIALS and filed Dec. 31, 2012. The foregoing application is herein incorporated by reference.

A general overview of performing an OER search based on the query and learning-specific features will now be described in the context of FIG. 2. The system 106 may receive the query as already discussed. The content similarity measurement module 210 may calculate the CSM_m as already discussed. The OER search module 230 may extract multiple learning-specific features from learning materials included in the OER resources mentioned above. The OER search module 230 may calculate one or more additional measurements for each of the learning materials based on the extracted learning-specific features. The one or more additional measurements may be different than the CSM_m and/or may include one or more learning-specific measurements such as a freshness measurement (FM), an academic credit measurement (ACM), a social media credit measurement (SMCM), and/or a comprehensiveness measurement (CM). The OER search module 230 and/or the ranking module 222 may rank each of the learning materials based on both the CSM_m and the one or more additional measurements. Ranking the learning materials may include calculating a rank based on both the CSM_m and the one or more additional measurements. The rank calculated based on both the CSM_m and the one or more additional measurements may be referred to herein as an OER score to distinguish it from other ranks discussed herein.

With continued reference to FIG. 2, the search unification module 232 may be configured to unify the results of the multi-level search, including unifying the curation item results, the web results, and the OER results.

Figure 3:
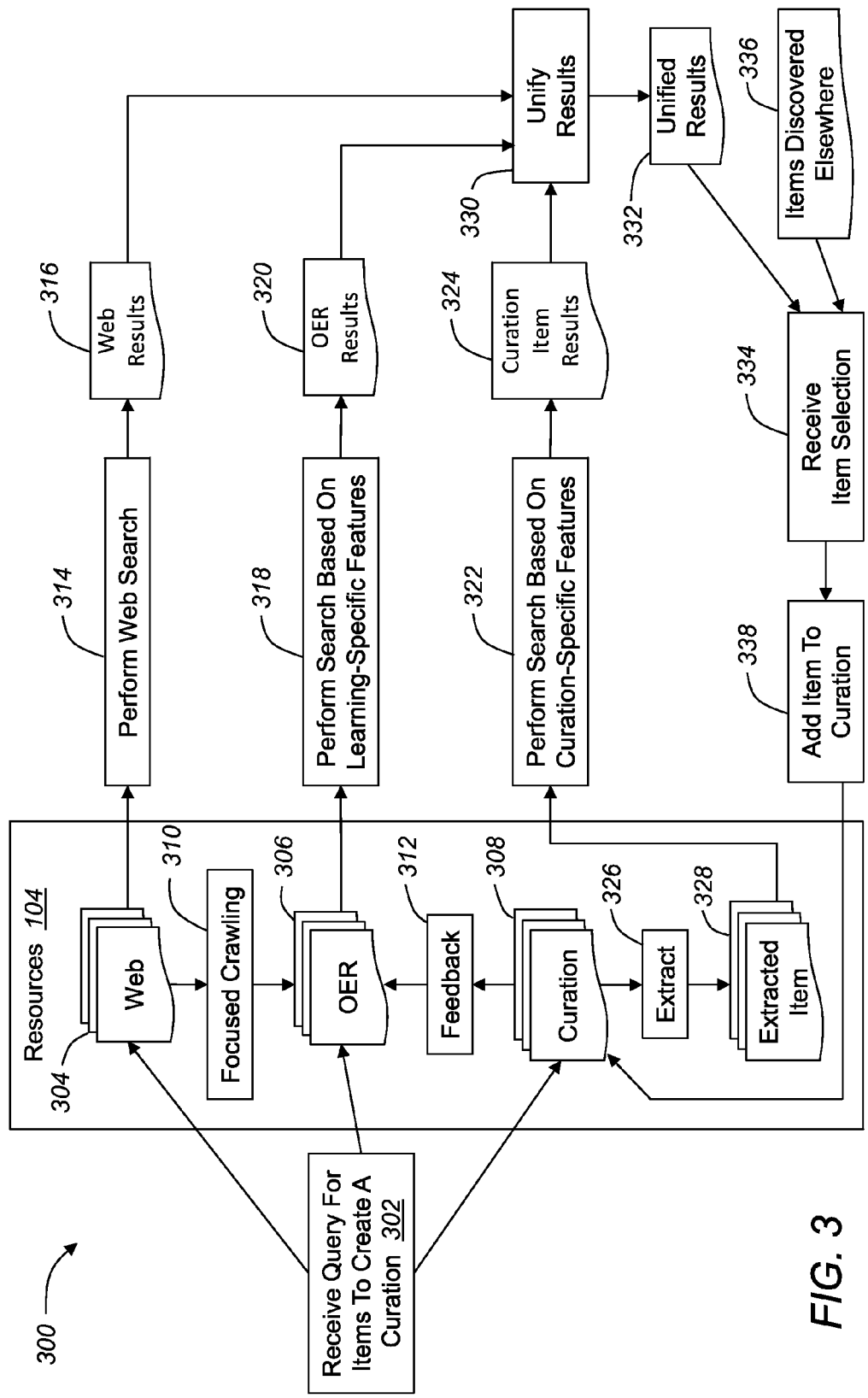
FIG. 3 shows an example flow diagram of a method that may be implemented in the operating environment 100 of FIG. 1A.

FIG. 3 shows an example flow diagram of a method 300 that may be implemented in the operating environment 100 of FIG. 1A, arranged in accordance with at least one embodiment described herein. The method 300 in some embodiments is performed by the system 106 of FIGS. 1A and 2. Although illustrated as discrete blocks, various blocks may be divided into additional blocks, combined into fewer blocks, or eliminated, depending on the desired implementation.

The method 300 may begin at block 302 in which a query for items to create a curation is received. The query may be received via the communication interface 204 of FIG. 2, for example, and may be used to search the resources 104.

As illustrated in FIG. 3, the resources may include web resources 304, OERs 306, and curations 308. As illustrated at block 310, the OERs 306 may be identified by a focused crawl of the web resources 304 and/or may be augmented based on feedback 312 from the creation and/or other analysis of the curations 308. For example, the curations may identify OERs not included in the OERs 306 which may be added to the OERs 306 via the feedback 312.

The method 300 may further include performing a multi-level search of the resources 104. Performing the multi-level search may include performing a web search at block 314 to generate web results 316, performing a search based on learning-specific features at block 318 to generate OER results 320, and performing a search based on curation-specific features at block 322 to generate curation item results 324, as already generally described above. In some embodiments, performing the search based on curation-specific features at block 322 may include extracting items at block 326 from each of the curations 308 to generate extracted items 328.

At block 330, the web results 316, the OER results 320, and the curation item results 324 may be unified to generate unified results 332.

At block 334, the system 106 may receive an item selection from the unified results 332 and/or from one or more items discovered elsewhere 336. At block 338, the selected item may be added to a curation being created by a curator. After completion of the curation being created, the curation may be added to the curations 308 in the resources 104.

Figure 4:
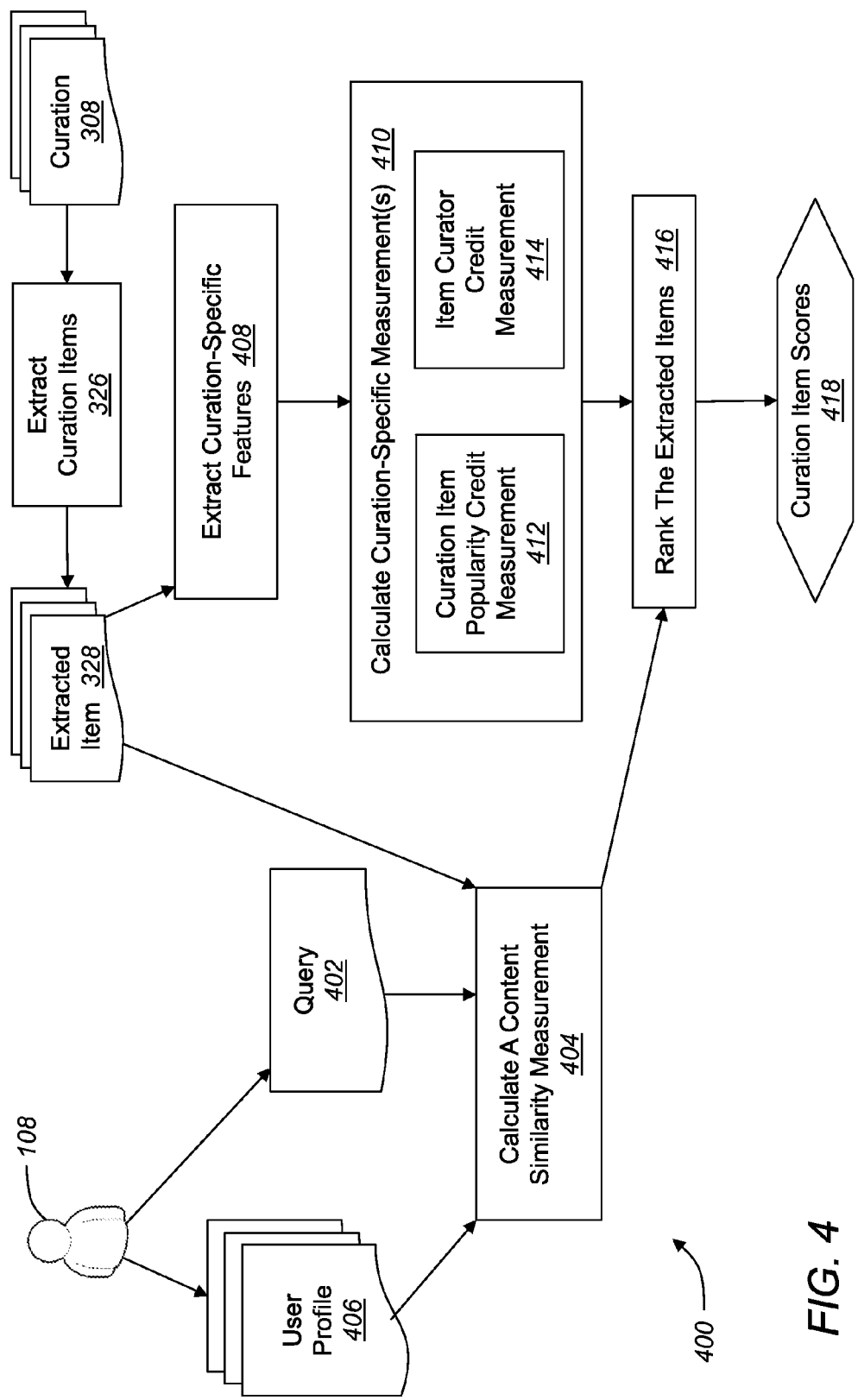
FIG. 4 shows an example flow diagram of a method of ranking candidate curation items.

FIG. 4 shows an example flow diagram of a method 400 of ranking candidate curation items, arranged in accordance with at least one embodiment described herein. The method 400 in some embodiments is performed by the system 106 of FIGS. 1A and 2 and/or may correspond to one or more of blocks 322 and 326 of FIG. 3. Although illustrated as discrete blocks, various blocks may be divided into additional blocks, combined into fewer blocks, or eliminated, depending on the desired implementation.

The method 400 may include, at block 326, extracting items from each of the curations 308 to generate extracted items 328 as already discussed with respect to FIG. 3. The method 400 may additionally include receiving a query 402 from one of the users 108 creating a curation. At block 404, a content similarity measurement for each of the extracted items 328 may be calculated based on the query 402. Optionally, the calculation of the content similarity measurement may be further based on a user profile 406 of the user 108 and/or may be calculated according to the formula for CSM_m as discussed above. At block 408, curation-specific features may be extracted from the extracted items 328. At block 410, one or more curation-specific measurements 412, 414 may be calculated for the extracted items 328 based on the extracted curation-specific features. In the illustrated embodiment, the one or more additional measurements 412, 414 include a curation item popularity credit measurement 412, and an item curator credit measurement 414. The curation item popularity credit measurement 412 and the item curator credit measurement 414 may be calculated according to the formulas for, respectively, Item_Popularity_Credit_m and Item_Curator_Credit_m already discussed above. At block 416, the extracted items 328 are ranked based on the content similarity measurement and the one or more additional measurements to generate a curation item score 418 for each of the extracted items 328. The extracted items 328 may be ranked according to the formula for R already discussed above.

The curation item scores 418 may be output to the user 108. Alternately or additionally, links to the extracted items 328 and/or short descriptions thereof may be output to the user 108 with an order of the links reflecting the curation item scores 418, or the relevancy, of each of the extracted items 328 with respect to the query 402. Alternately or additionally, the ranked extracted items may make up the curation item results 324 of FIG. 3 and may be merged with the web results 316 and/or the OER results 320 of FIG. 3 before links and/or short descriptions of items are output to the user 108.

In some embodiments, the method 400 of FIG. 4 may be combined with or included as part of the method 300 of FIG. 3, and/or the method 400 of FIG. 4 may further include one or more of the operations of the method 300 of FIG. 3. For example, and with combined reference to FIGS. 3-4, the method 400 may further include searching web resources 304 based on the query 402 to generate web results 316. The OERs 306 may be searched based on the query 402 and learning-specific features to generate OER results 320. The web results 316, the OER results 320, and the curation item results 324 may be unified 330 to generate unified results 332. A selection of an item from the unified results 332 may be received 334. The selected item may be added 338 to a curation.

Figure 5:
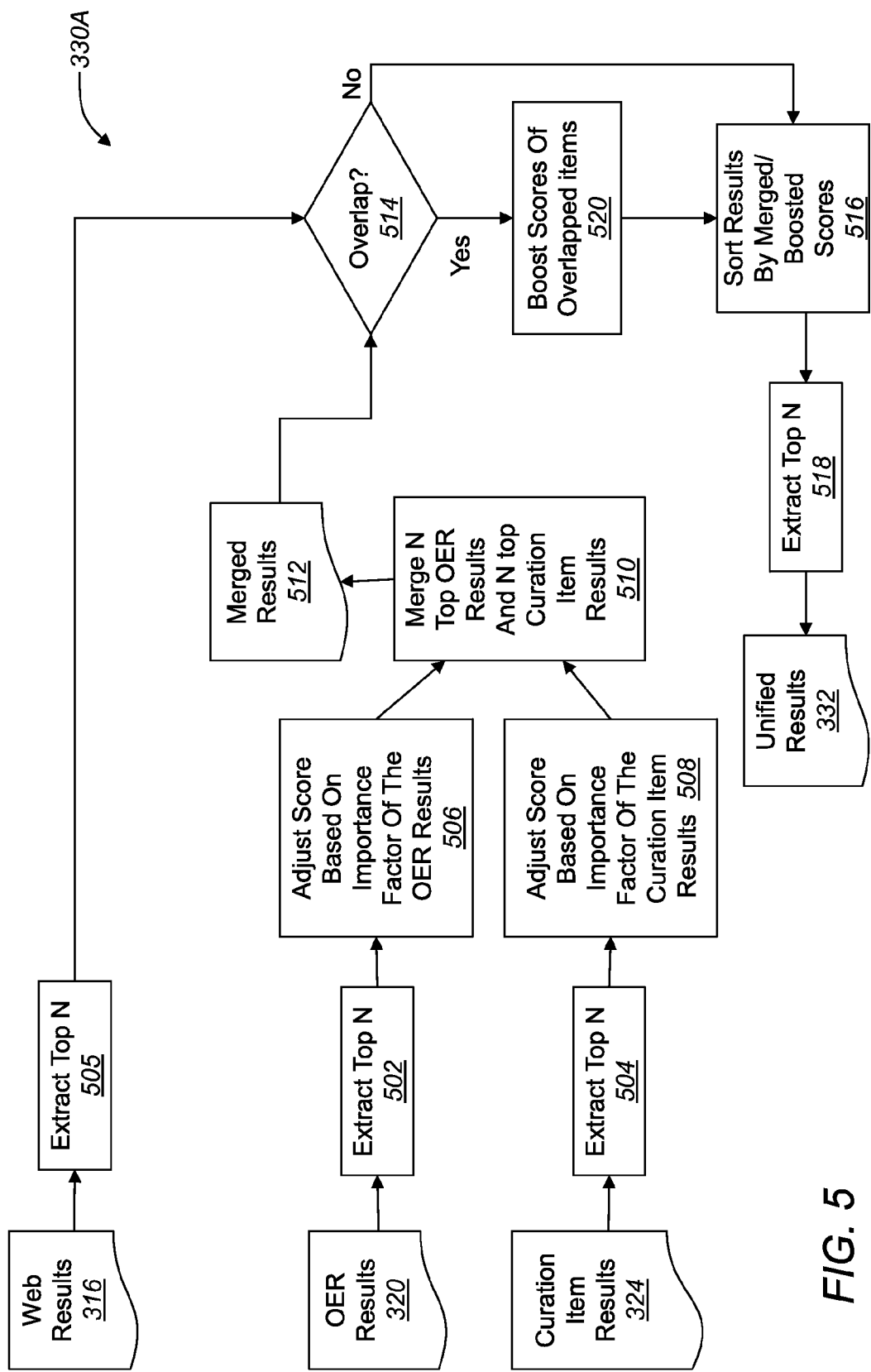
FIG. 5 shows an example flow diagram of a method of unifying results of a multi-level search.

FIG. 5 shows an example flow diagram of a method 330A of unifying results of a multi-level search, arranged in accordance with at least one embodiment described herein. The method 330A is an example embodiment of block 330 of FIG. 3 and in some embodiments is performed by the system 106 of FIGS. 1A and 2. Although illustrated as discrete blocks, various blocks may be divided into additional blocks, combined into fewer blocks, or eliminated, depending on the desired implementation.

The method 330A may include, at blocks 502 and 504, extracting N top results from the OER results 320 and extracting N top results from the curation item results 324, where N is a constant. Optionally, the method 330A may further include extracting N top results from the web results 316 at block 505.

In some embodiments, the curation item results 324 may be weighted more than the OER results 320. To weight the curation item results 324 differently than the OER results 320, a first importance factor may be applied to each of the N top results from the OER results 320 and a second importance factor may be applied to each of the N top results from the curation item results 324. In particular, at block 506, an OER score of each of the N top results from the OER results 320 may be adjusted based on an importance factor of the OER results 320 and, at block 508, a curation item score of each of the N top results from the curation item results 324 may be adjusted based on an importance factor of the curation item results 324. Each OER score and curation item score may be adjusted by multiplying the corresponding score by the corresponding importance factor. In an example embodiment, the importance factor of the OER results 320 may be 0.3 and the importance factor of the curation item results 324 may be 0.7.

At block 510, the N top results from the OER results 320 may be merged with the N top results from the curation item results 324 to generate merged results 512. Each item in the merged results 512 may have a merged score based on the corresponding adjusted OER scores and the corresponding adjusted curation item scores. The merging may include merging each item from the N top results of the OER results 320 that overlaps a corresponding item from the N results of the curation item results 324 into a corresponding merged item. Two items may be said to overlap when they are the same or substantially the same. The merging may also include generating the merged score for each merged item as a sum of the adjusted curation item score of the corresponding item from the N top results from the curation item results 324 and the adjusted OER score of the corresponding item from the N top results from the OER results 320. The merged score for each non-merged item may be the corresponding adjusted OER score or the corresponding adjusted curation item score.

Accordingly, in some embodiments, the merged score for each item in the merged results 512 may be determined as follows. The merged score may consist essentially of a corresponding adjusted OER score for each item in the merged results 512 that is in the N top results from the OER results 320 and that does not overlap with any item in the N top results from the curation item results 324. The merged score may consist essentially of a corresponding adjusted curation item score for each item in the merged results 512 that is in the N top results from the curation item results 324 and that does not overlap with any item in the N top results from the OER results 320. The merged score may consist essentially of a sum of a corresponding adjusted OER score and a corresponding adjusted curation item score for each merged item, e.g., each item in the merged results 512 that is in both the N top results from the OER results 320 and in the N top results from the curation item results. The foregoing illustrates one example of how the merged score for each item in the merged results 512 may be determined and should not be construed as limiting.

The unified results 332 may include N of the merged results 512 determined as follows. At decision block 514, if it is determined that there is no overlap between the N top results of the web results 316 and the merged results 512 ("No" at block 514), or in the absence of the web results 316 or N top results of the web results 316, the merged results 512 are sorted by merged scores at block 516 and N top results are extracted therefrom at block 518 to generate the unified results 332. Alternately, if it is determined that there is overlap between the N top results of the web results 316 and the merged results 512 ("Yes" at block 514), the merged score for each item in the merged results 512 that overlaps an item in the N top results of the web results 316 may be boosted at block 520, followed by sorting the merged results 512 by the merged and/or boosted scores at block 516 and extracting the N top results therefrom at block 518 to generate the unified results 332.

In an example embodiment, the boost applied to the merged score for each item in the merged results 512 that overlaps an item in the N top results of the web results 316 may be 10%, or some other value. For example, if the merged score of an item in the merged results 512 that overlaps an item in the N top results of the web results 316 is 0.02709, the merged score may be boosted by 10% to 0.02980.

Figure 6:
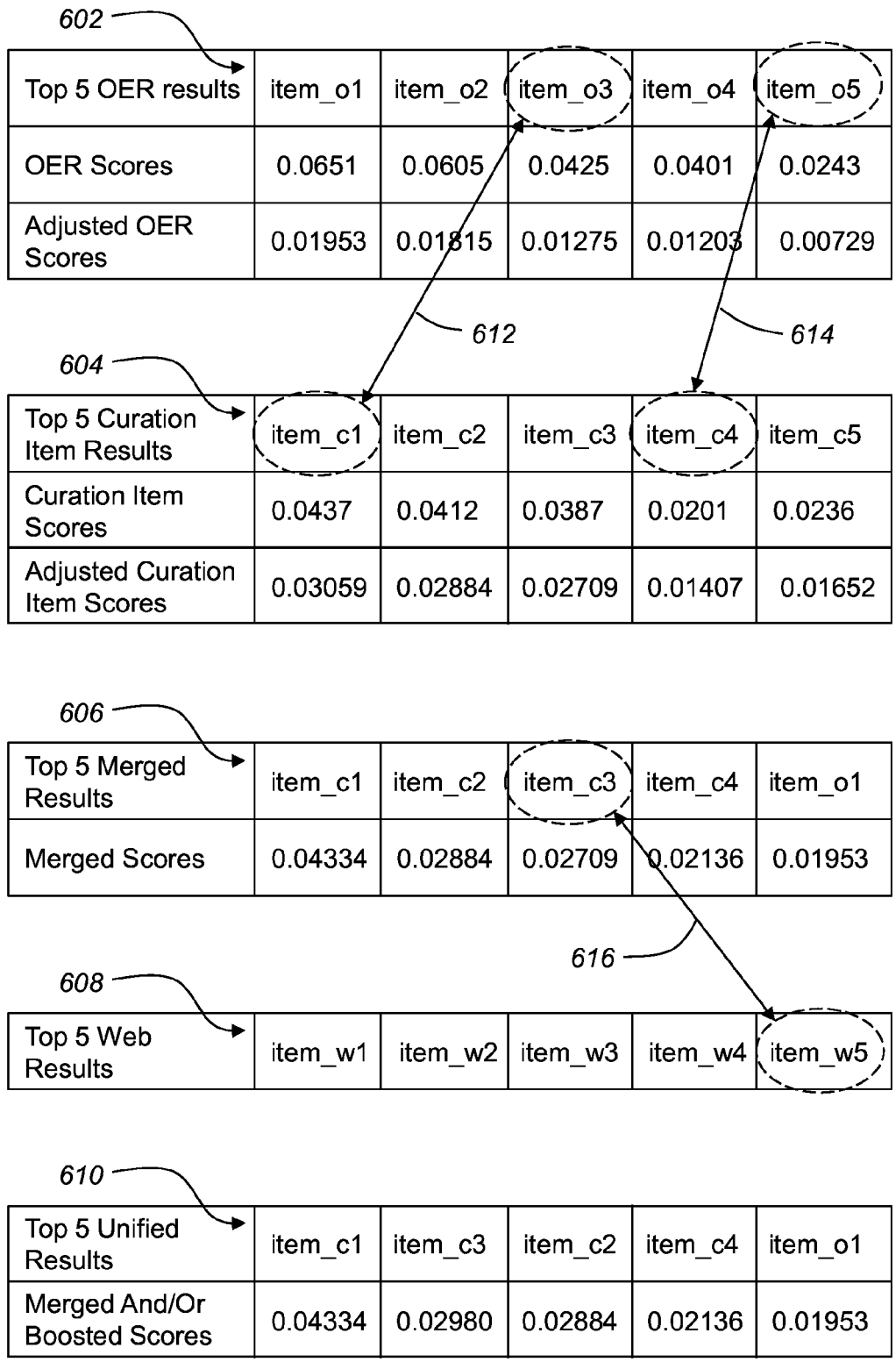
FIG. 6 illustrates various example OER results, curation results, merged results, web results, and unified results.

A specific embodiment of the method 330A of FIG. 5 will now be described with reference to FIG. 6. FIG. 6 illustrates various example OER results, curation results, merged results, web results, and unified results, arranged in accordance with at least one embodiment described herein. In particular, FIG. 6 illustrates a top 5 OER results 602, a top 5 curation item results 604, a top 5 merged results 606, a top 5 web results 608, and a top 5 unified results 610.

With combined reference to FIGS. 5-6, the method 330A may include extracting the top 5 OER results from the OER results 320 at block 502 based on OER scores of the OER results 320. The top 5 curation item results 604 may be extracted from the curation item results 324 at block 504 based on curation item scores of the curation item results 324. As illustrated in FIG. 6, the top 5 OER results 602 and the top 5 curation item results 604 are sorted according to OER scores or curation item scores.

At block 506, the OER scores of the top 5 OER results 602 are adjusted based on the importance factor of the OER results 320. In particular, as illustrated in FIG. 6, the OER scores of the top 5 OER results 602 are adjusted based on the importance factor of the OER results 320 by multiplying each of the OER scores by an importance factor of 0.3 to generate the adjusted OER scores of FIG. 6.

At block 508, the curation item scores of the top 5 curation item results 604 are adjusted based on the importance factor of the curation item results 324. In particular, as illustrated in FIG. 6, the curation item scores of the top 5 curation item results 604 are adjusted based on the importance factor of the curation item results 324 by multiplying each of the curation item scores by an importance factor of 0.7 to generate the adjusted curation item scores of FIG. 6.

At block 510, the top 5 OER results 602 are merged with the top 5 curation item results 604 to generate the merged results 512 in FIG. 5, or the top 5 merged results 606 in FIG. 6. As indicated by arrows 612 and 614 of FIG. 6, some of the items in the top 5 OER results 602 may overlap some of the items in the top 5 curation item results 604. More particularly, item_o3 and item_o5 of the top 5 OER results 602 may respectively overlap item_c1 and item_c4 of the top 5 curation item results 604. Merging the top 5 OER results 602 with the top 5 curation item results 604 may include merging item_o3 and item_c1 into a single merged item (e.g., item_c1) in the top 5 merged results 606, and merging item_o5 and item_c4 into a single merged item (e.g., item_c4) in the top 5 merged results 606.

Merging the top 5 OER results 602 with the top 5 curation item results 604 may additionally include: generating a merged score for item_c1 in the top 5 merged results 606 by summing the adjusted OER score of item_o3 and the adjusted curation item score of item_c1 such that the merged score for item_c1 in the top 5 merged results 606 is 0.01275+0.03059=0.04334; and generating a merged score for item_c4 in the top 5 merged results 606 by summing the adjusted OER score of item_o5 and the adjusted curation item score of item_c4 such that the merged score for item_c4 in the top 5 merged results 606 is 0.00729+0.01407=0.02136. The merged score for item_c2 and item_c3 in the top 5 merged results 606 may be the corresponding adjusted curation item scores since these items from the top 5 curation item results 604 do not overlap items in the top 5 OER results 602, and the merged score for item_o1 may be the corresponding adjusted OER score since this item from the top 5 OER results 602 does not overlap items in the top 5 curation item results 604.

As indicated by arrow 616 of FIG. 6, item_c3 of the top 5 merged results 606 overlaps item_w5 in the top 5 web results 608. Accordingly, at block 520 of the method 330A of FIG. 5, the merged score of item_c3 in the top 5 merged results 606 may be boosted. In the example of FIG. 6, the merged score of item_c3 is boosted by 10%, changing the merged score of 0.02709 of the item_c3 in the top 5 merged results 606 to the merged and adjusted score of 0.02980 of the item_c3 in the top 5 unified results 610. Whereas item_c1, item_c2, item_c4, and item_o1 in the top 5 merged results 606 do not overlap with any of the items in the top 5 web results 608, the merged and boosted scores of item_c1, item_c2, item_c4, and item_o1 in the top 5 unified results 610 are the same as the merged scores of item_c1, item_c2, item_c4, and item_o1 in the top 5 merged results 606.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of ranking candidate curation items, the method comprising:
   receiving a query;
   extracting a plurality of items from a plurality of curations;
   calculating, based on the query, a content similarity measurement for each of the extracted plurality of items;
   extracting, from each of the extracted plurality of items, a plurality of curation-specific features;
   calculating one or more curation-specific measurements for each of the extracted plurality of items based on the extracted plurality of curation-specific features, the one or more curation-specific measurements being different than the content similarity measurement;
   ranking each of the extracted plurality of items based on both the content similarity measurement and the one or more curation-specific measurements to generate a plurality of curation item results;
   searching a plurality of web resources based on the query to generate a plurality of web results;
   searching a plurality of open education resources based on the query and learning-specific features to generate a plurality of open education resource results;
   unifying the plurality of web results, the plurality of open education resource results and the plurality of curation item results to generate a plurality of unified results including a plurality of items;
   receiving a selection of an item from the unified results; and
   adding the selected item to a curation;
   wherein the unifying the plurality of web results, the plurality of open education resource results and the plurality of curation item results to generate the plurality of unified results including the plurality of items comprises:
     extracting N top results from the plurality of open education resource results, and N top results from the plurality of curation item results, where N is a constant;
     adjusting an open education resource score of each of the N top results from the plurality of open education resource results based on an importance factor of the plurality of open education resource results;
     adjusting a curation item score of each of the N top results from the plurality of curation item results based on an importance factor of the plurality of curation item results; and
     merging the N top results from the plurality of open education results with the N top results from the plurality of curation item results to generate merged results, each item in the merged results having a merged score, the merged scores of the items in the merged results being based on the corresponding adjusted open education resource scores and the corresponding adjusted curation item scores,
   wherein the plurality of unified results include N results from the merged results.

2. The method of claim 1, wherein the merging the N top results from the plurality of open education results with the N top results from the plurality of curation item results to generate the merged results comprises:
  merging an item from the N top results of the plurality of open education resource results that overlaps an item from the N top results of the plurality of curation item results into a merged item; and
  generating a merged score for the merged item as a sum of the adjusted curation item score of the corresponding item from the N top results from the plurality of curation item results and the adjusted open education resource score of the corresponding item from the N top results from the plurality of open education resource results.

3. The method of claim 1, further comprising:
  extracting N top results from the plurality of web results; and
  boosting the merged score for each item in the merged results that overlaps an item in the N top results of the plurality of web results,
  wherein the plurality of unified results include N top results of the merged results, the N top results determined based on at least one of the merged and boosted scores of the merged results.

4. The method of claim 1, wherein the merged score for each item in the merged results consists essentially of:
  a corresponding adjusted open education resource score for each item in the merged results that is in the N top results from the plurality of open education resource results and that does not overlap with any item in the N top results from the plurality of curation item results;
  a corresponding adjusted curation item score for each item in the merged results that is in the N top results from the plurality of curation item results and that does not overlap with any item in the N top results from the plurality of open education resource results; and
  a sum of a corresponding adjusted open education resource score and a corresponding adjusted curation item score for each item in the merged results that is in both the N top results from the plurality of open education resource results and in the N top results from the plurality of curation item results.

5. A method of ranking candidate curation items, the method comprising:
  receiving a query;
  extracting a plurality of items from a plurality of curations;
  calculating, based on the query, a content similarity measurement for each of the extracted plurality of items;
  extracting, from each of the extracted plurality of items, a plurality of curation-specific features;
  calculating one or more curation-specific measurements for each of the extracted plurality of items based on the extracted plurality of curation-specific features, the one or more curation-specific measurements being different than the content similarity measurement; and
  ranking each of the extracted plurality of items based on both the content similarity measurement and the one or more curation-specific measurements to generate a plurality of curation item results;
  wherein the one or more curation-specific measurements comprises, for each of the extracted plurality of items, a curation item popularity credit measurement relating to a popularity of a corresponding extracted item;
  wherein calculating the curation item popularity credit measurement includes calculating a curation popularity credit measurement of each curation in which a corresponding extracted item is included;
  wherein the curation item popularity credit measurement is calculated according to $\Sigma_{i=1}^{CN} Curation\_Popularity\_i/INi$, wherein CN is a number of curations that each includes the corresponding extracted item, Curation_popularity_i is the curation popularity credit measurement of a curation i, and INi is a number of items included in the curation i.

6. The method of claim 5, wherein:
  the curation popularity credit measurement of a curation i is calculated according to Curation_popularity_i=V*View_Score_i+B*Bookmark_Score_i+C*Comment_Score_i;
  Curation_popularity_i is the curation popularity credit measurement of curation i;
  V, B, and C are constants where V+B+C =1;
  View_Score_i is calculated based on a number of views of the curation i;
  Bookmark_Score_i is calculated based on a number of bookmarks to the curation i; and
  Comment_Score_i is calculated based on a number of comments to the curation i.

7. A method of ranking candidate curation items, the method comprising:
  receiving a query;
  extracting a plurality of items from a plurality of curations;
  calculating, based on the query, a content similarity measurement for each of the extracted plurality of items;
  extracting, from each of the extracted plurality of items, a plurality of curation-specific features;
  calculating one or more curation-specific measurements for each of the extracted plurality of items based on the extracted plurality of curation-specific features, the one or more curation-specific measurements being different than the content similarity measurement; and
  ranking each of the extracted plurality of items based on both the content similarity measurement and the one or more curation-specific measurements to generate a plurality of curation item results;
  wherein the one or more curation-specific measurements comprise, for each of the extracted plurality of items, an item curator credit measurement relating to a popularity of curations created by and a social network influence of each curator that has included the corresponding extracted item in a curation of the curator;
  wherein the item curator credit measurement is calculated according to $\Sigma_{i=1}^{CN} Curation\_Popularity\_i/INi$, where CN is a number of curations that each includes the corresponding extracted item, Curation_Curator_Credit_i is a curation curator credit measurement of a curation i that includes the corresponding extracted item, INi is a number of items included in the curation i, Curation Curator Credit i is calculated according to CCPi* SNI, CCPi is a curation content popularity of a corresponding curator that has included the corresponding extracted item in at least one curation of the corresponding curator, and SNIi is a social network influence of the corresponding curator.

8. The method of claim 7, wherein the curation content popularity CCPi of the corresponding curator is calculated by:

extracting all curations created by the corresponding curator;

calculating a curation popularity credit measurement of each of the extracted curations created by the corresponding curator;

calculating a total curation popularity credit measurement by summing the curation popularity credit measurements of the extracted curations created by the corresponding curator; and calculating an average curation popularity credit measurement by dividing the total curation popularity credit measurement by a number of the extracted curations created by the corresponding curator.

9. A system of ranking candidate curation items, the system comprising:

a processor implemented at least partially by hardware; and a non-transitory computer-readable medium communicatively coupled to the processor and having computer-executable instructions stored thereon that are executable by the processor to perform operations comprising:

receiving a query;

extracting a plurality of items from a plurality of curations;

calculating, based on the query, a content similarity measurement for each of the extracted plurality of items;

extracting, from each of the extracted plurality of items, a plurality of curation-specific features;

calculating one or more curation-specific measurements for each of the extracted plurality of items based on the extracted plurality of curation-specific features, the one or more curation-specific measurements being different than the content similarity measurement;

ranking each of the extracted plurality of items based on both the content similarity measurement and the one or more curation-specific measurements to generate a plurality of curation item results;

searching a plurality of web resources based on the query to generate a plurality of web results;

searching a plurality of open education resources based on the query and learning-specific features to generate a plurality of open education resource results;

unifying the plurality of web results, the plurality of open education resource results and the plurality of curation item results to generate a plurality of unified results including a plurality of items;

receiving a selection of an item from the unified results; and adding the selected item to a curation;

wherein the unifying the plurality of web results, the plurality of open education resource results and the plurality of curation item results to generate the plurality of unified results including the plurality of items comprises:

extracting N top results from the plurality of open education resource results, and N top results from the plurality of curation item results, where N is a constant;

adjusting an open education resource score of each of the N top results from the plurality of open education resource results based on an importance factor of the plurality of open education resource results;

adjusting a curation item score of each of the N top results from the plurality of curation item results based on an importance factor of the plurality of curation item results; and merging the N top results from the plurality of open education results with the N top results from the plurality of curation item results to generate merged results, each item in the merged results having a merged score, the merged scores of the items in the merged results being based on the corresponding adjusted open education resource scores and the corresponding adjusted curation item scores, wherein the plurality of unified results include N results from the merged results.

10. The system of claim 9, wherein the merging the N top results from the plurality of open education results with the N top results from the plurality of curation item results to generate the merged results comprises:

merging an item from the N top results of the plurality of open education resource results that overlaps an item from the N top results of the plurality of curation item results into a merged item; and generating a merged score for the merged item as a sum of the adjusted curation item score of the corresponding item from the N top results from the plurality of curation item results and the adjusted open education resource score of the corresponding item from the N top results from the plurality of open education resource results.

11. The system of claim 9, the operations further comprising:

extracting N top results from the plurality of web results; and boosting the merged score for each item in the merged results that overlaps an item in the N top results of the plurality of web results, wherein the plurality of unified results include N top results of the merged results, the N top results determined based on at least one of the merged and boosted scores of the merged results.

12. The system of claim 9, wherein the merged score for each item in the merged results consists essentially of:

a corresponding adjusted open education resource score for each item in the merged results that is in the N top results from the plurality of open education resource results and that does not overlap with any item in the N top results from the plurality of curation item results;

a corresponding adjusted curation item score for each item in the merged results that is in the N top results from the plurality of curation item results and that does not overlap with any item in the N top results from the plurality of open education resource results; and a sum of a corresponding adjusted open education resource score and a corresponding adjusted curation item score for each item in the merged results that is in both the N top results from the plurality of open education resource results and in the N top results from the plurality of curation item results.

13. A system of ranking candidate curation items, the system comprising:

a processor implemented at least partially by hardware; and a non-transitory computer-readable medium communicatively coupled to the processor and having computer-executable instructions stored thereon that are executable by the processor to perform operations comprising:
receiving a query;
extracting a plurality of items from a plurality of curations;
calculating, based on the query, a content similarity measurement for each of the extracted plurality of items;
extracting, from each of the extracted plurality of items, a plurality of curation-specific features;
calculating one or more curation-specific measurements for each of the extracted plurality of items based on the extracted plurality of curation-specific features, the one or more curation-specific measurements being different than the content similarity measurement; and
ranking each of the extracted plurality of items based on both the content similarity measurement and the one or more curation-specific measurements to generate a plurality of curation item results;
wherein the one or more curation-specific measurements comprises, for each of the extracted plurality of items, a curation item popularity credit measurement relating to a popularity of a corresponding extracted item;
wherein calculating the curation item popularity credit measurement includes calculating a curation popularity credit measurement of each curation in which a corresponding extracted item is included;
wherein the curation item popularity credit measurement is calculated according to $\sum_{i=1}^{CN}$Curation_Popularity_i/INi, wherein CN is a number of curations that each includes the corresponding extracted item, Curation_popularity_i is the curation popularity credit measurement of a curation i, and INi is a number of items included in the curation i.

14. The system of claim 13, wherein:
the curation popularity credit measurement of the curation i is calculated according to Curation_popularity_i=V*View_Score_i+ B*Bookmark_Score_i+C*Comment_Score_i;
Curation_popularity_i is the curation popularity credit measurement of curation i;
V, B, and C are constants where V+B+C=1;
View_Score i is calculated based on a number of views of the curation i;
Bookmark_Score_i is calculated based on a number of bookmarks to the curation i; and
Comment_Score_i is calculated based on a number of comments to the curation i.

15. A system of ranking candidate curation items, the system comprising:
a processor implemented at least partially by hardware; and
a non-transitory computer-readable medium communicatively coupled to the processor and having computer-executable instructions stored thereon that are executable by the processor to perform operations comprising:
receiving a query;
extracting a plurality of items from a plurality of curations;
calculating, based on the query, a content similarity measurement for each of the extracted plurality of items;
extracting, from each of the extracted plurality of items, a plurality of curation-specific features;
calculating one or more curation-specific measurements for each of the extracted plurality of items based on the extracted plurality of curation-specific features, the one or more curation-specific measurements being different than the content similarity measurement; and
ranking each of the extracted plurality of items based on both the content similarity measurement and the one or more curation-specific measurements to generate a plurality of curation item results;
wherein the one or more curation-specific measurements comprise, for each of the extracted plurality of items, an item curator credit measurement relating to a popularity of curations created by and a social network influence of each curator that has included the corresponding extracted item in a curation of the curator;
wherein the item curator credit measurement is calculated according to $\sum_{i=1}^{CN}$Curation_Popularity_i/INi, where CN is a number of curations that each includes the corresponding extracted item, Curation_Curator_Credit_i is a curation curator credit measurement of a curation i that includes the corresponding extracted item, INi is a number of items included in the curation i, Curation Curator Credit i is calculated according to CCPi* SNI, CCPi is a curation content popularity of a corresponding curator that has included the corresponding extracted item in at least one curation of the corresponding curator, and SNIi is a social network influence of the corresponding curator.

16. The system of claim 15, wherein the curation content popularity CCPi of the corresponding curator is calculated by:
extracting all curations created by the corresponding curator;
calculating a curation popularity credit measurement of each of the extracted curations created by the corresponding curator;
calculating a total curation popularity credit measurement by summing the curation popularity credit measurements of the extracted curations created by the corresponding curator; and
calculating an average curation popularity credit measurement by dividing the total curation popularity credit measurement by a number of the extracted curations created by the corresponding curator.

* * * * *